United States Patent [19]

Chen

[11] 4,052,239

[45] Oct. 4, 1977

[54] METHOD AND APPARATUS FOR MAKING FIBER REINFORCED TAPE

[76] Inventor: Henry T. Chen, 5212 N. Yvonne Ave., San Gabriel, Calif. 91776

[21] Appl. No.: 651,737

[22] Filed: Jan. 23, 1976

[51] Int. Cl.² .............................................. B32B 5/08
[52] U.S. Cl. .................................... 156/177; 156/440; 28/100
[58] Field of Search ............... 156/176, 177, 179, 178, 156/180, 181, 175, 440, 439; 28/1 CL; 66/84 A; 242/47.12, 47.13; 226/95, 158, 162

[56] References Cited

U.S. PATENT DOCUMENTS

| | | | |
|---|---|---|---|
| 2,962,080 | 11/1960 | Hirsch | 66/84 A |
| 3,222,730 | 12/1965 | Kalwaites | 226/95 |
| 3,649,411 | 3/1972 | Bolles | 156/440 |
| 3,705,068 | 12/1972 | Dobo et al. | 156/181 |
| 3,823,049 | 7/1974 | Vetrovec | 156/181 |
| 3,878,591 | 4/1975 | Jense | 28/1 CL |

Primary Examiner—Charles E. Van Horn
Assistant Examiner—Michael W. Ball
Attorney, Agent, or Firm—Christie, Parker & Hale

[57] ABSTRACT

Fiber reinforced tape is manufactured by moving the tape through a first area while looping a thread on one side of the tape in a plane transverse to the direction of movement of the tape. Each end of the loop is supported by retractable supports as it is formed. After formation each end of a single loop is moved into the plane of the tape to deposit the thread against the tape and the thread is then secured to the tape. A machine for manufacturing fiber reinforced tape comprises a cross-belt moving in a closed loop transverse to the direction of movement of the tape with the cross-belt having a carrier for the thread and means at each end of the cross-belt that move in and out of the plane of the thread to form and support the ends of the loop at each end of the cross-belt as the thread is carried by the cross-belt. The machine further comprises means for moving each end of the loop into the plane of the tape to deposit the thread on the tape in a zig-zag pattern with the ends being held in place by a vacuum belt that moves in the same direction as the tape. Rollers secure the thread to the tape.

12 Claims, 9 Drawing Figures

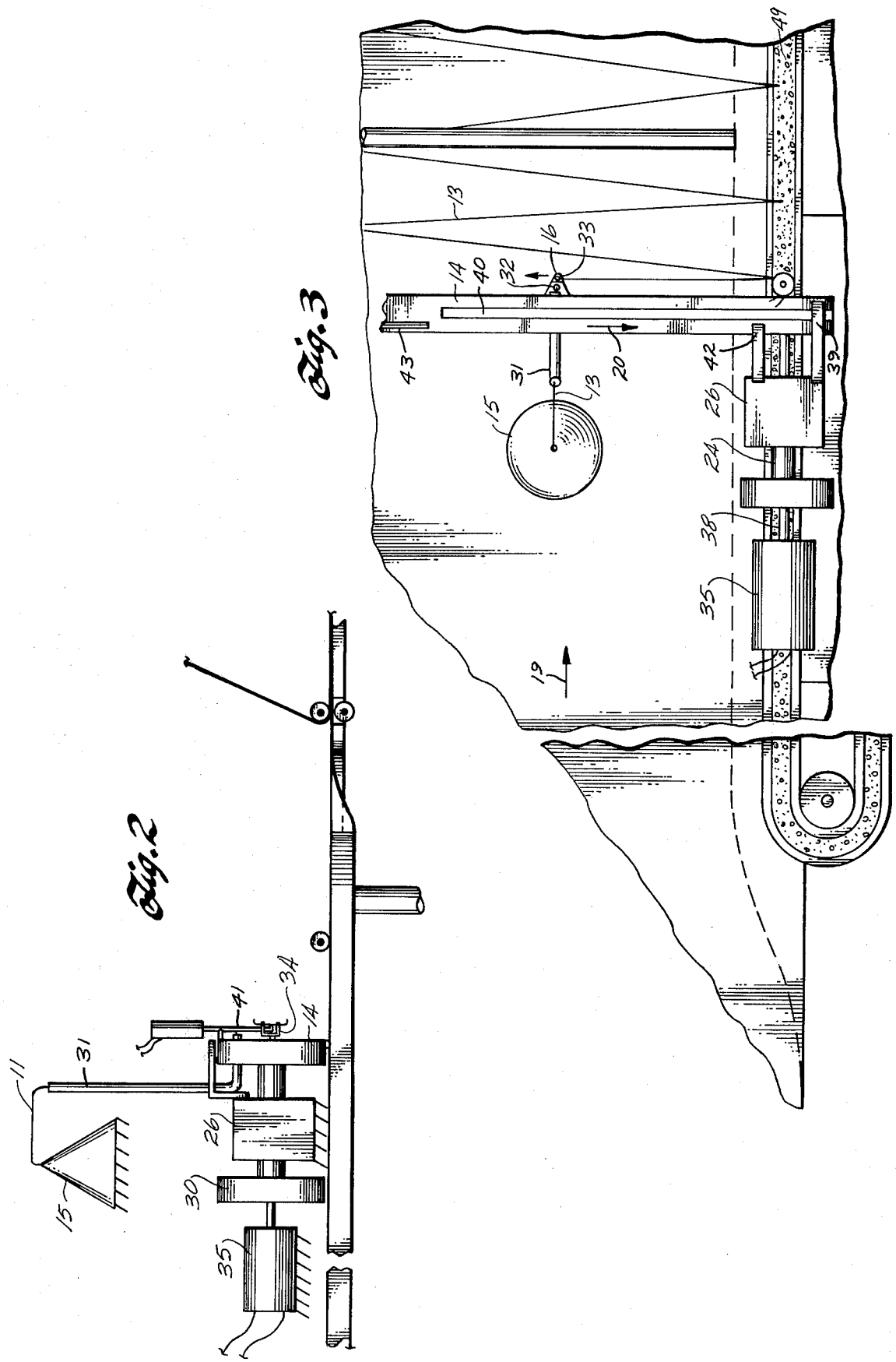

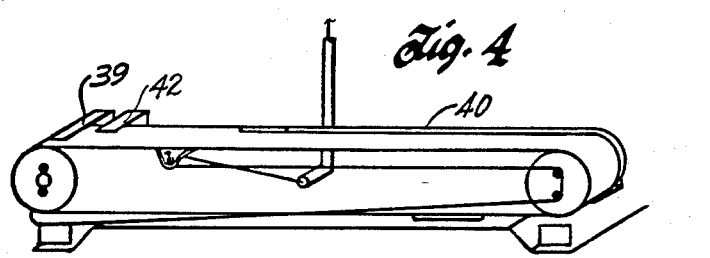
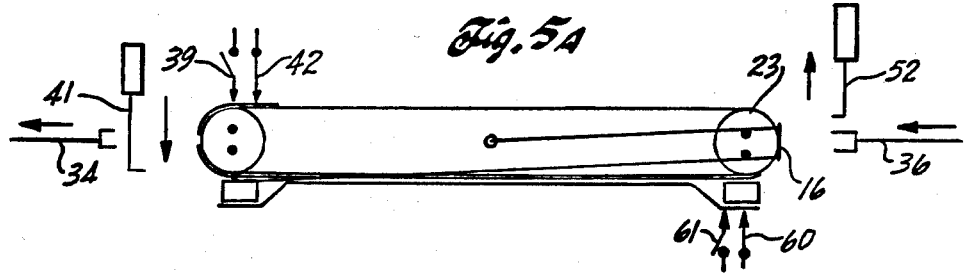
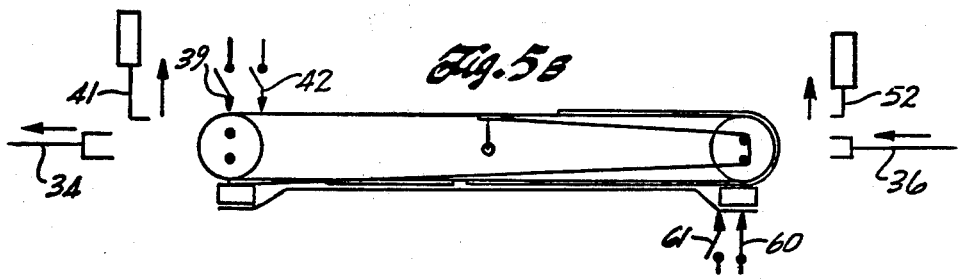
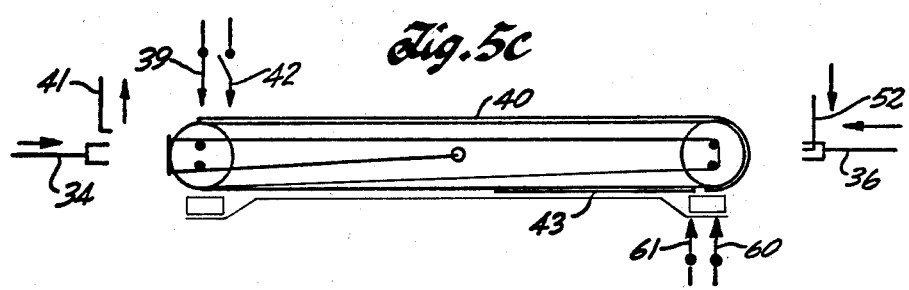
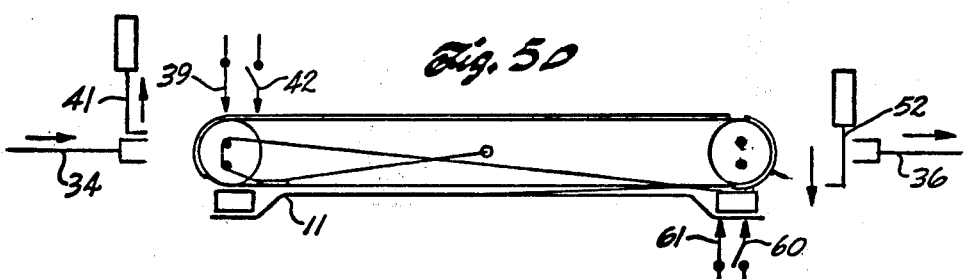
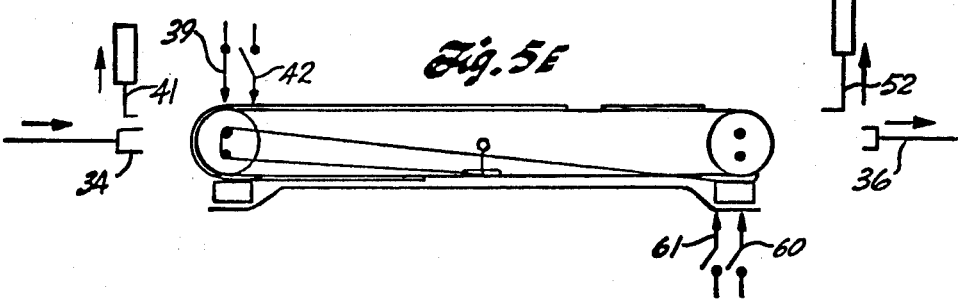

METHOD AND APPARATUS FOR MAKING FIBER REINFORCED TAPE

BACKGROUND OF THE INVENTION

Field of the Invention

This invention relates to the manufacture of tape and more particularly to the manufacture of fiber reinforced tape by a winding method and a machine for the manufacture of the tape.

SUMMARY OF THE INVENTION

A fiber reinforced tape is economically and efficiently produced by the method of this invention which comprises the steps of moving a strip of tape through a first area, looping a thread on one side of the strip of tape in a plane transverse to the direction of movement of the strip of tape in the first area with each end of the loop near the edge of the strip of tape, supporting each end of the loop as it is formed, moving each end of a single loop into the plane of the strip of tape to deposit the thread against the strip of tape, and securing the thread to the strip of tape.

A machine for the manufacture of fiber reinforced tape in accordance with this invention comprises means for moving a strip of tape through a first area, means for looping a thread on one side of a strip of tape in a plane transverse to the direction of movement of the strip of tape in the first area with each end of the loop being near the edge of the strip of tape, means for supporting each end of the loop as it is formed, means for moving each end of a single loop into the plane of the strip of tape to deposit the thread against the strip of tape and means for securing the thread to the strip of tape.

The looping means of the machine comprises a cross-belt between two pulleys with the pulleys positioned at opposite edges of the strip of tape so that the cross-belt moves transverse to the direction of movement of the strip of tape and carries a means for feeding the thread from a spool to produce a loop in a plane adjacent to the plane of the cross-belt. The supporting means of the machine comprises a pronged element movable into the plane of the loop adjacent the cross-belt and the moving means comprises an arm between the plane of the loop and the cross-belt for supporting an end of the loop upon retraction of the pronged element with the arm being movable into the plane of the strip of tape for depositing the thread against the strip of tape. Each end of a loop of thread is held by a vacuum belt so that the thread is held against the strip of tape.

BRIEF DESCRIPTION OF THE DRAWING

The above and other features and advantages of the present invention may be understood more clearly and fully upon consideration of the following specification and drawing in which

FIG. 2 is an enlarged side elevation view of the portion of the machine of FIG. 1 for applying the reinforcing thread to the tape;

FIG. 3 is an enlarged top plan view of one side of the machine of FIG. 1 depicting the portion of the machine at one side of the tape for applying the reinforcing thread to the tape;

FIG. 4 is a diagrammatic view of the thread handling portion of the machine of FIG. 1, and FIGS. 5A through 5E are diagrammatic views depicting the steps of forming the loop of thread that is applied to the tape by the machine of FIG. 1.

DESCRIPTION OF THE PREFERRED EMBODIMENT

Figure 1:
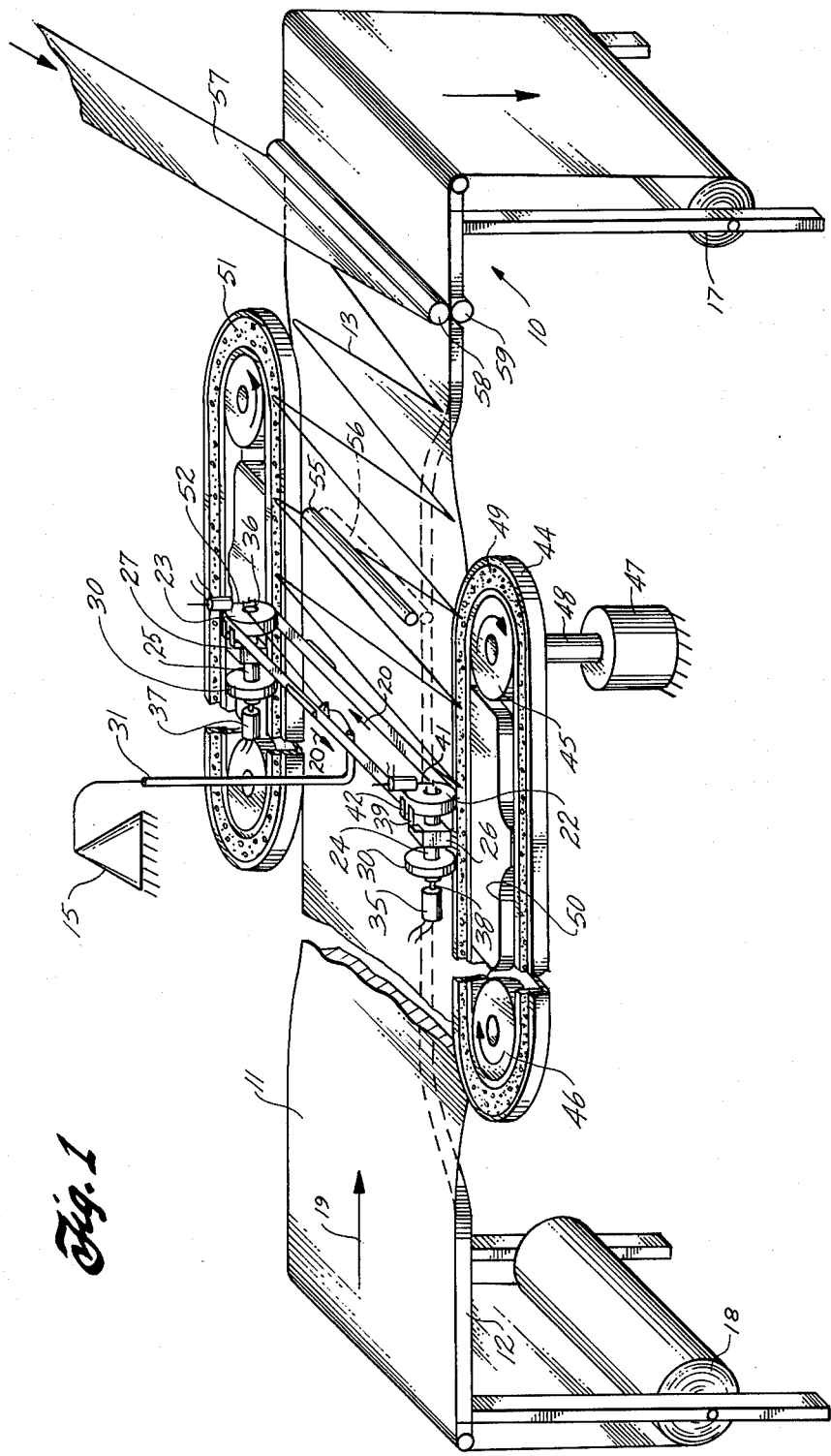
FIG. 1 is a perspective view of a machine partially in diagrammatic form for manufacture of reinforced tape in accordance with this invention.

The machine for the manufacture of fiber reinforcing tape in accordance with this invention as shown in the drawing comprises a support 10 for the tape 11. The support 10 may have a horizontal portion 12, as shown, with the tape traveling in a horizontal plane or the tape may travel in a vertical plane or some inclined plane with the reinforcing fiber or thread 13 being secured thereto. The thread 13 is applied to the tape 11 in a zig-zag pattern by operation of a cross-belt 14 in cooperation with a spool of thread 15 and a carrier 16 attached to the side of the cross-belt 14. A plurality of cross-belt stages may be provided where more than one thread is to be secured to the tape. However, for purposes of illustration and simplicity, only one stage is shown in the drawing. A take-up roll 17 which is driven by a driving means, not shown, is provided at one end of the support 10. A supply roll 18 is provided at the opposite end of the support 10 for supplying the tape to which the fiber is secured. While the tape 11 moves in the direction of the arrow 19, the cross-belt 14 moves transverse to this direction in the direction of arrows 20. The cross-belt 14 has pulleys 22 and 23 positioned at each end of the belt 14. The pulleys 22 and 23 are journalled in bearing blocks 26 and 27. One or both pulleys 22 and 23 may be driven by operation of a drive pulley 30 by a drive means, not shown.

The thread of each station is supplied from a spool 15 through a guide means 31 to an area in the middle of the cross-belt 14. The thread at the end of the guide means 31 passes through a carrier 16, attached to the edge of the belt 14, so that it travels in a plane adjacent to the cross-belt 14. On the carrier 16 the thread 13 from the guide means 31 passes through a first hole 32 and out a second hole 33. As the carrier 16 travels around the loop of the cross-belt 14, it forms a loop of thread in the plane of the carrier. The looped thread is deposited in a zig-zag pattern on the tape 11. At the left end of the cross-belt 14 is a pronged element 34 which is movable into and out of the plane of the loop by a solenoid 35. The pronged element 34 and solenoid 35 cooperate to support the loop of thread at the left end, while a second pronged element 36 and solenoid 37 cooperate to support the loop at the right end. The pronged element 34 has a shaft 38 passing through and within the shaft 24. The solenoid 35 moves the element 34 into and out of the plane of the thread loop under the control of a microswitch 39, which is triggered by a raised portion 40 on the cross-belt 14.

After the loop is formed at the left end and the carrier 16 has travelled around the pulley 23 at the right end, an arm 41 is moved into the area between the plane of the loop and the cross-belt so that when the element 34 is retracted the loop will be carried by the arm 41. Arm 41 is movable into the plane of the tape 11 to deposit the thread against the tape 11. The arm 41 is controlled by action of a microswitch 42 which is triggered by a raised portion 43 on the cross-belt 14. The loop of thread that is brought into the plane of the tape 11 is held at its left end by a vacuum belt 44 that has one side moving under the pulley 22 and above the edge of the tape 11 to receive the end of the loop of the thread 13. The belt 44 is looped around a pulley 45 at one end and a pulley 46 at the other end. One of the pulleys may be driven such as pulley 45 by a motor 47 through a shaft 48. The middle portion of the belt 44 contains a porous material 49 to permit the suction from a suction means 50 to attract and hold the left ends of the loops of thread 13. A similar vacuum belt 51 on the right side of the tape 11 holds the right ends of the loops of thread 13 and in cooperation with the vacuum belt 44 holds the thread against the tape 11.

After the thread 13 is applied to the tape 11 in a zig-zag pattern by the operation of the cross-belt 14 and pronged elements 34 and 36 and arms 41 and 52, it is secured to the tape in the middle portion thereof by a pair of rollers 55 and 56, the drive means of which is not shown. These rollers 55 and 56 may be rubber, teflon, plastic or some similar material or metal. Generally, the underneath roller 56 will be metal and the rollers may be heated or cooled according to the kind of adhesive glue on the thread 13 or tape 11. After the thread 13 is secured to the tape 11 by rollers 55 and 56, it is released by the vacuum belts 44 and 51. The ends are secured by action of rollers 58 and 59. The completed reinforced tape is stored in the take-up roll 17. A top sheet 57 may be applied to provide a laminated tape with the top sheet 57 being secured to the thread 13 and tape 11 by action of the pair of rollers 58 and 59.

The formation of the loop of thread and the depositing thereof on the tape in a zig-zag pattern may be understood more easily by referring to FIG. 4 and FIGS. 5A through 5E which diagrammatically show the operation of the pronged elements and the arms in cooperation with the cross-belt 14 and microswitches 39 and 42 at the left end and 60 and 61 at the right end.

In FIG. 5A the carrier 16 is moved around the right end of the loop around pulley 23. Raised portion 40 on the cross-belt 14 triggers microswitch 60 causing the pronged element 36 to move forward into the plane of the thread. As the carrier 16 moves on around the pulley 23, the end of the loop is formed around and supported by the element 36. The pronged element 36 remains in its forward position with the microswitch 60 closed until the end of the loop is formed at the left end as shown in FIG. 5C at which time arm 52 moves down and element 36 is retracted so that the right end of the loop is supported by the arm 52 which continues to move down into the plane of the tape 11 as shown in FIG. 5D. The arm 52 is controlled by the action of microswitch 61 which is responsive to the raised portion 43 on the cross-belt 14.

The method of manufacturing a fiber reinforced tape in accordance with this invention includes the steps of moving the strip of tape 11 through a first area where the cross-belt 14 is positioned. In the area of the cross-belt 14, the thread is looped in a plane transverse to the direction of the movement of the strip of tape as shown by arrows 20 for the movement of the cross-belt 14 and the arrow 19 for the movement of the tape 11. Each end of the loop of thread is near the edge of the tape and is supported by a pronged element 34 or 36 as the loop is formed. After looping the thread at one end, the end of the loop is moved into the plane of the strip of tape by action of the arm 41 or 52 and the thread is deposited in a zig-zag pattern against the strip of tape 11. After the thread is deposited against the strip of tape and held in position by the vacuum belts 44 and 51, the thread is secured to the tape 11 by action of the rollers 55 and 56 followed by the action of the rollers 58 and 59. A plurality of loops of thread may be formed by providing a plurality of stations such as the station involving cross-belt 14 depicted in FIGS. 1 through 5.

The cross-belts of the additional station may circulate in the same direction as cross-belt 14 or in the opposite direction, as desired.

The density of the thread on the tape may be controlled by the speed of the cross-belt relative to the speed of the tape. The density will be greatest for a slow moving tape and a fast moving cross-belt.

Various changes may be made in the details of construction without departing from the spirit and scope of this invention as defined by the appended claims.

What is claimed is:

1. A method of manufacturing a fiber reinforced tape comprising the steps of:

moving a strip of tape through a first area, looping a thread on one side of the strip of tape in a plane transverse to the direction of movement of the strip of tape in the first area with each end of the loop near the edge of the strip of tape, supporting each end of the loop as it is formed, moving each end of a single loop at a right angle to the plane of the tape in the first area into the plane of the strip of tape to deposit the thread against the strip of tape, and securing the thread to the strip of tape.

2. A method of manufacturing a fiber reinforced tape in accordance with claim 1 further comprising the steps of:

forming additional loops of thread on one side of the strip of tape, supporting each end of each additional loop as it is formed, moving each end of each additional loop into the plane of the strip of tape to deposit the thread against the strip of tape, and securing each thread to the strip of tape.

3. A method of manufacturing a fiber reinforced tape in accordance with claim 1 comprising the further step of:

holding the thread against the strip of tape by a suction means at each edge of the tape.

4. A method of manufacturing a fiber reinforced tape in accordance with claim 1 wherein the thread is deposited against the strip of tape in a zig-zag pattern.

5. A method of manufacturing a fiber reinforced tape in accordance with claim 1 comprising the further step of:

securing a second strip of tape to the first strip of tape and thread to sandwich the thread between the two strips of tape.

6. An apparatus for manufacturing a fiber reinforced tape comprising:

means for moving a strip of tape through a first area, means for looping a thread on one side of the strip of tape in a plane transverse to the direction of movement of the strip of tape in the first area with each end of the loop being near the edge of the strip of tape, means for supporting each end of the loop as it is formed, means for moving each end of a single loop at a right angle to the plane of the tape in the first area into the plane of the strip of tape to deposit the thread against the strip of tape, and means for securing the thread to the strip of tape.

7. The apparatus in accordance with claim 6 wherein the thread is supplied from a spool and the looping means comprises a cross-belt between two pulleys with the pulleys positioned at opposite edges of the strip of tape and the cross-belt moves transverse to the direction of movement of the strip of tape and carries a means for feeding the thread from a spool to produce a loop in a plane adjacent to the plane of the cross-belt.

8. Apparatus in accordance with claim 7 wherein the supporting means comprises a pronged element movable into the plane of the loop and the moving means comprises an arm between the plane of the loop and the cross-belt for supporting an end of the loop upon retraction of the pronged element with the arm being movable into the plane of the strip of tape for depositing the thread against the strip of tape.

9. Apparatus in accordance with claim 8 further comprising:
 means at each end of the cross-belt for moving the pronged element into the plane of the loop and the arm down to carry the loop retraction of the pronged element, all in response to trigger means carried by the cross-belt.

10. An apparatus in accordance with claim 8 further comprising:
 a vacuum belt at each edge of the strip of tape for holding each end of the loop of thread against the strip of tape.

11. An apparatus in accordance with claim 10 wherein the vacuum belt moves in the same direction as the strip of tape at a selected velocity relative to the velocity of the strip of tape.

12. A machine for manufacture of a fiber reinforced tape having fibers in a zig-zag pattern by a winding method comprising:
 at least one looping belt positioned transverse to the longitudinal position of the tape and adjacent to the tape,
 a thread carrier attached to the side of the belt and moving in a closed loop with the belt,
 means for moving the tape relative to the belt,
 means at each end of the belt for supporting the thread as it loops around the end,
 means cooperating with the supporting means to carry the looped end from the supporting means to a vacuum belt,
 a vacuum belt on each side of the tape for holding the thread against the tape and securing the looped end of the thread against the belt by a vacuum force, and
 a pair of securing rollers spaced from the belt for securing the thread to the tape.

* * * * *

UNITED STATES PATENT AND TRADEMARK OFFICE
CERTIFICATE OF CORRECTION

PATENT NO. : 4,052,239
DATED : October 4, 1977
INVENTOR(S) : Henry T. Chen

It is certified that error appears in the above—identified patent and that said Letters Patent are hereby corrected as shown below:

Column 5, line 18, -- upon -- should be inserted after "loop" and before "retraction".

Signed and Sealed this

Thirty-first Day of October 1978

[SEAL]

Attest:

RUTH C. MASON
Attesting Officer

DONALD W. BANNER
Commissioner of Patents and Trademarks